INVENTORS.
Thomas T. Watson.
BY Edward P. Godschall.

United States Patent Office 2,961,761
Patented Nov. 29, 1960

---

2,961,761

PRODUCTION OF CLAD STEEL PLATES BY THE 2-PLY METHOD

Thomas T. Watson and Edward P. Godschall, Coatesville, Pa., assignors to Lukens Steel Company, Coatesville, Pa., a corporation of Pennsylvania Filed Apr. 25, 1958, Ser. No. 730,957

11 Claims. (Cl. 29—470.9)

The present invention is addressed to the production of clad steel plates.

One of the principal objects of the invention is to provide an improved process for producing clad steel plates having an excellent bond between the different metals.

Another object of the invention is the provision of an improved method of heating clad steel plates utilizing the different temperature ranges for 2-ply assemblies of different thicknesses.

A further object is the provision of a method which eliminates the formation of gases between the backing steel and insert by causing an intimate contact between the contacting surfaces of the backing steel and insert.

Yet another object is to provide an improved method for reducing the probability of weld failure from the sudden exhausting of the gases from the assembly.

Still another object is to provide an improved procedure for cladding all types of carbon or low alloy steel with corrosion-resistant metals such as austenitic and ferritic stainless steels, nickel, Monel metal and other metals and alloys of the same nature which are capable of being bonded with steel by the hot rolling process.

Other objects will appear hereinafter throughout the specification.

Figure 1:
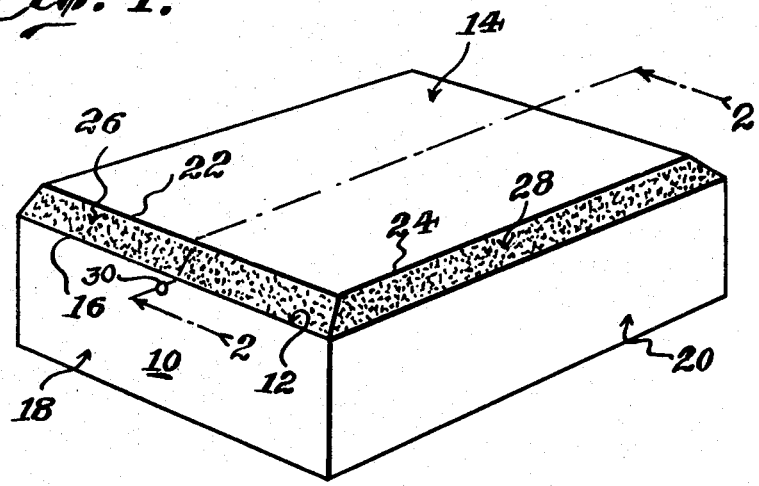
Figure 1 is a perspective view of the clad metal pack assembly of this invention.

Preferably the 2-ply assembly process of this invention includes the application of a cladding metal slab upon a surface of a base metal steel slab, the plane surface of which has been made smooth and clean by machining and blast-cleaning steps, and, in certain instances, nickel plated.

Referring now to the drawing, the carbon or alloy steel slab is indicated by the numeral 10. This base slab is provided with a machined upper surface 12.

The cladding metal slab, shown at 14, has a machined base surface 16 which is adapted to lie in face to face engagement with the machined upper surface 12 of the base metal slab.

Figure 2:
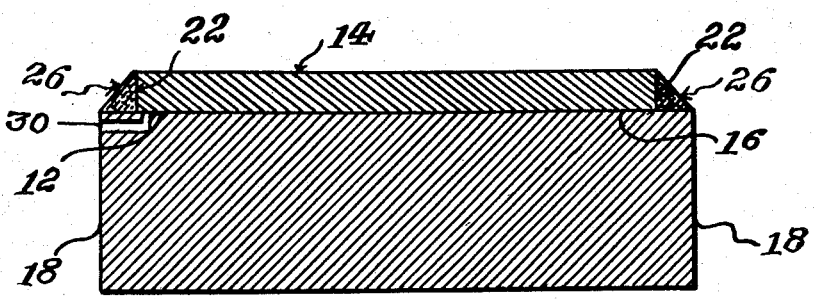
Figure 2 is a longitudinal vertical section of the clad metal pack assembly taken on the line 2—2 of Figure 1.

As shown in drawing Figures 1 and 2, the base slab is preferably rectangular in shape and is provided with short vertical side faces 18, and long vertical side faces 20.

The insert 14 which is of the same general shape as the base slab is provided with side faces 22 and 24 respectively, but such faces are of less length and width than those of the base slab, so as to provide recesses on the four faces of the slab. These end and side recesses are filled with welding material 26 and 28, respectively.

This 2-ply method preferably requires the clad insert material to be welded to the backing steel, with the weld deposited around the perimeter of the insert. In the production of clad plates by this method, a paramount consideration is the difference in the linear coefficients of thermal expansion between the components. The problem is very acute with the austenitic grades of stainless steel because the stainless steel has a thermal coefficient 1.5 times greater than the backing steel; hence, as the size and gauge of the insert increases, the strain imposed upon the weld area increases, and the probability of weld failure during heating increases. The expansion problem is not encountered with the ferritic and martensitic classes of stainless steel.

Experience has shown that restricting limits for the successful application of the 2-ply practice are imposed upon the assembly dimensions. Nickel plating facilities prevent the plating of an insert greater than 106" x 82". Therefore, based on an insert with these maximum dimensions, the following limitations are imposed upon the practice:

| Backing steel dimensions: | Insert dimensions |
| --- | --- |
| Less than 10" in gauge | Up to 1 5/16" |
| Greater than 10" in gauge | Up to 1 5/16" |

With 2-ply assembly method, the stainless steel is subjected to the atmosphere of the pit. For prolonged periods of time at elevated temperatures, the surface of the stainless steel develops extensive and detrimental cracks; consequently, a temperature barrier is imposed on a production operation.

The temperature barrier was discovered in the initial experiments with the 2-ply method and was associated with the following heating cycle:

The assembly is charged in a pit cooled to 1200° F. or less, heated to 2050°–2150° F. and soaked at this temperature for ½ hour per inch of assembly thickness. The temperature is then raised to a uniform temperature of between 2300° F. and 2340° F. and rolled to gauge.

With the stated heating practice, the assembly was rolled directly to plate gauge without difficulty. The entire surface of the clad plate, however, was cracked.

To circumvent the temperature barrier, a heating technique was employed which required a double heating and a double conversion. The heating practice succeeded in restraining the hot tearing of the stainless insert; however, the economics of the practice were very adverse.

In order to improve present practice, to reduce the cost of production, and to obviate the chances of weld failure for various thicknesses of 2-ply assemblies, an effort was made to systematically refine the current heating cycle.

Heretofore the 2-ply assembly was charged in a pit cooled to 1200° F. or less, with the clad surface down on the top of two ingots. The assembly was equalized two hours, then heated slowly to a uniform temperature of between 1825° F. and 1875° F., following which it was rolled to breakdown gauge. The assembly was then recharged in the same pit with the clad surface leaning against the side wall, and heated to a uniform temperature of between 1900° F. and 1950° F. Following this process the assembly was rolled to plate gauge.

As distinguished from this process and as a refinement thereof, the temperature was systematically elevated by prescribed increments, using the following heating practices for 2-ply assemblies.

Figure 3:
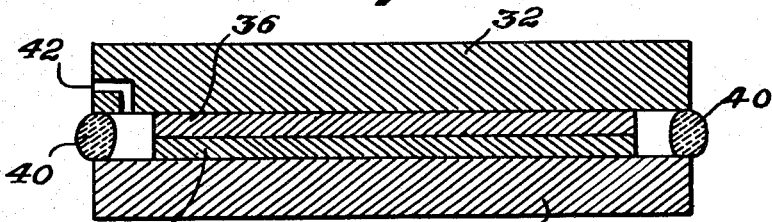
Figure 3 is a longitudinal vertical section through a modified form of pack assembly.

In the form of pack assembly shown in Figure 3, 32 and 34 represent two base slabs between which two cladding plates 36 and 38 are mounted. The edges of the cladding plates are spaced inwardly from the edges of the larger base slabs to provide a peripheral recess whose outer side is closed by the welds 40. As in the form of Figures 1 and 2, the peripheral recess is vented to the atmosphere through the vent opening 42 so that as the assembly is rolled, all gases between and around the plates may escape through the vent and the cladding plates may expand into the recess. In this form of the pack, two clad plates are produced at the same time, a suitable parting material being employed between the two cladding plates to prevent these plates from adhering to each other as the assembly is rolled to weld the cladding plates to the base slabs. The cladding plates or slabs have substantially the same composition and consequently the same coefficients of expansion.

The assembly shown in Figure 3 is charged in the pit and heated for the same time and at the same temperatures as that of Figures 1 and 2, depending on its thickness.

The first heating practice is recommended for assemblies with a total thickness of less than 8". The heating cycle may be applied with one or two assemblies in the pit, as follows:

The assembly is charged in a pit which is cooled to 1800° F. with the clad surface leaning against the side wall and the vent end up, heated directly to between 2125° F. and 2175° F. and soaked at this temperature until uniform, using a minimum time of 0.25 hour per inch of assembly thickness. The treated assembly is then rolled to plate gauge.

In the second heating practice, the 2-ply assembly should have a total thickness in the range between 8" and 16", and two assemblies should be charged in the pit, the heating cycle being as follows:

One pack or assembly is made to rest against one side wall and the other pack against the opposite side wall. The assembly on each wall has the clad surface leaning against the wall with the vent hole up. The pit is cooled to 1800° F. before the process begins, then heated directly to between 1950° F. and 1975° F. The assemblies are soaked at this temperature until uniform, using a minimum time of 0.40 hour per inch of assembly thickness. The temperature is then raised to between 2125° F. and 2175° F., the assemblies being soaked at this temperature for a minimum time of 0.25 hour per inch of assembly thickness, then rolled directly to plate gauge.

During the third heating practice, the 2-ply assembly should be greater than 16" in total thickness, and one assembly should be charged in the pit. The assembly is charged in a pit cooled to 1800° F. with the clad surface leaning against the side wall and with the vent end up. The assembly is then heated directly to between 1950° F. and 1975° F. and soaked at this temperature until uniform, allowing a minimum time of 0.30 hour per inch of assembly thickness. The temperature is then raised to between 2125° F. and 2175° F., and the assembly soaked at this temperature until uniform, a minimum time of 0.25 hour per inch of assembly thickness being allowed, following which treatment the assembly is rolled directly to plate gauge.

The rolling of the 2-ply assemblies to plate gauge in each of the methods above recited is based upon the appearance of the assembly as drawn from the soaking pit. As stated heretofore, the difference in the linear coefficients of thermal expansion between the backing steel and the insert is acute, particularly between the austenitic grades of stainless steel, because such an insert has a thermal coefficient 1.5 times greater than the backing steel. This causes the insert to bow away from the backing steel in the form of a catenary. The space between the insert and the backing steel contains a mixture of gases. Thus in order to effect a bond between the backing steel and the insert the juxtaposed faces of these components must come into intimate contact with each other. To accomplish such contact and to reduce the possibility of weld failure from sudden exhausting of the gases from the assembly during rolling, the assembly is rolled in the following manner:

The assembly is first placed on the mill approach table with the clad surface down and with the vent hole last to enter the mill. On the first several passes, five passes being typical, the assembly is rolled in one direction only, in order to evacuate the gases from the assembly. The reduction per pass is 0.10". Subsequent drafts are made with 0.25" to 0.40" reduction per pass until the assembly is rolled to gauge.

The above description and drawings disclose several methods which may be used in practicing the invention, and specific language has been employed in describing the same. It will, nevertheless, be understood that no limitations of the scope of the invention are thereby contemplated, and that various alterations and modifications in said inventive steps may be used such as would occur to one skilled in the art to which the invention relates.

We claim:

1. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent in one end thereof, charging the assembly in a heated soaking pit which is cooled to about 1800° F. with the vent end up, heating directly to a temperature of at least 1950° F. and soaking at this temperature until uniform using a minimum of time of 0.25 hour per inch of assembly thickness, and then removing the assembly from the pit and rolling to weld the contacting slab surfaces together and also reduce the assembly to plate gauge.

2. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent in one end thereof, charging the assembly in a heated soaking pit which is cooled to about 1800° F. with the vent end up, heating directly to a temperature of at least 1950° F. and soaking at this temperature until uniform using a minimum of time of 0.25 hour per inch of assembly thickness, and then removing the assembly from the pit, placing the assembly on the mill approach table with the clad surface down and with the vent hole last to enter the mill and subjecting the assembly to a plurality of passes by rolling in one direction only from the closed end to the vent end of the assembly, to weld the contacting slab surfaces together and also reduce the assembly to plate gauge.

3. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent in one end thereof, charging the assembly in a heated soaking pit which is cooled to about 1800° F. with the vent end up, heating directly to a temperature of at least 1950° F. and soaking at this temperature until uniform using a minimum of time of 0.25 hour per inch of assembly thickness, and then raising the temperature to between 2125° F. and 2175° F. and soaking at this temperature for a minimum time of 0.25 hour per inch of assembly thickness, and then rolling directly to weld the contacting slab surfaces together and also reduce the assembly to plate gauge.

4. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent in one end thereof, charging the assembly in a heated soaking pit which is cooled to about 1800° F. with the vent end up, heating directly to a temperature of at least 1950° F. and soaking at this temperature until uniform using a minimum of time of 0.25 hour per inch of assembly thickness, and then raising the temperature to between 2125° F. and 2175° F. and soaking at this temperature for a minimum time of 0.25 hour per inch of assembly thickness, and placing the assembly on the mill approach table with the clad surface down and with the vent hole the last to enter the mill and subjecting the assembly to a plurality of passes by rolling in one direction only from the closed end to the vent end of the assembly towards the vent end thereof, to weld the contacting slab surfaces together and also reduce the assembly to plate gauge.

5. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab but leaving a vent at one end thereof, charging the assembly in a heated soaking pit which is cooled to about 1800° F. with the vent end up, heating directly to a temperature between 2125° F. and 2175° F. and soaking at this temperature until uniform, using a minimum time of 0.25 hour per inch of assembly thickness wherein the total assembly thickness is less than 8", and rolling the assembly to weld the contacting slab surfaces together and also reduce the assembly to plate gauge.

6. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab but leaving a vent at one end thereof, charging the assembly in a heated soaking pit which is cooled to about 1800° F. with the vent end up, heating directly to a temperature between 2125° F. and 2175° F. and soaking at this temperature until uniform, using a minimum time of 0.25 hour per inch of assembly thickness wherein the total assembly thickness is less than 8", removing the assembly from the pit and placing the same on a mill table with the clad surface facing downwardly and with the vent hole last to enter the mill, and subjecting the assembly to a plurality of passes by rolling in one direction only from the closed end to the vent end of the assembly until the assembly is reduced to weld the contacting slab surfaces together and also reduce the assembly to plate gauge.

7. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent at one end thereof, said assembly being 8" to 16" in thickness, charging the assembly in a heated soaking pit which is cooled to about 1800° F. with the assembly leaning against a wall of the pit, then heating directly to between 1950° F. and 1975° F. and soaking at this temperature until uniform using a minimum time of 0.40 hour per inch of assembly thickness, raising the temperature in said pit to between 2125° F. and 2175° F. and soaking at this temperature for a minimum time of 0.25 hour per inch of assembly thickness, and then rolling the assembly to weld the contacting slab surfaces together and also reduce the assembly to plate gauge.

8. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab but leaving a vent at one end thereof, said assembly being 8" to 16" in thickness, charging the assembly in a heated soaking pit which is cooled to about 1800° F. with the assembly leaning against a wall of the pit, then heating directly to between 1950° F. and 1975° F. and soaking at this temperature until uniform using a minimum time of 0.40 hour per inch of assembly thickness, raising the temperature in said pit to between 2125° F. and 2175° F. and soaking at this temperature for a minimum time of 0.25 hour per inch of assembly thickness, and placing the assembly on the mill approach table with the clad surface facing downwardly and with the vent hole last to enter the mill, and subjecting the assembly to a plurality of passes by rolling in one direction only from the closed end of the assembly towards the vent end thereof, to weld the contacting slab surfaces together and also reduce the assembly to plate gauge.

9. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab but leaving a vent at one end thereof, said assembly being at least about 16" in thickness, charging the assembly in a heated soaking pit which is cooled to about 1800° F. with the clad surface leaning against the side wall of the pit, then heating directly to between 1950° F. and 1975° F. and soaking at this temperature until uniform allowing a minimum of time of 0.30 hour per inch of assembly thickness, raising the temperature in said pit to between 2125° F. and 2175° F. and soaking at this temperature until uniform while using a minimum time of 0.25 hour per inch of assembly thickness, and rolling the assembly to weld the contacting slab surfaces together and also reduce the assembly to plate gauge.

10. A method of producing a clad steel plate comprising forming a base metal steel slab, assembling on said slab a cladding slab of corrosion-resistant metal of a higher coefficient of expansion than that of said base slab, weld sealing the side edges of said cladding slab to said base metal slab, but leaving a vent at one end thereof, said assembly being at least about 16" in thickness, charging the assembly in a heated soaking pit which is cooled to about 1800° F. with the clad surface leaning against the side wall of the pit, then heating directly to between 1950° F. and 1975° F. and soaking at this temperature until uniform allowing a minimum of time of 0.30 hour per inch of assembly thickness, raising the temperature in said pit to between 2125° F. and 2175° F. and soaking at this temperature until uniform while using a minimum time of 0.25 hour per inch of assembly thickness, removing the assembly from the pit and placing the same on a mill table with the clad surface facing downwardly, and subjecting the assembly to a plurality of passes by rolling the same in one direction only from the closed end to the vent end until the assembly is reduced to weld the contacting slab surfaces together and also reduce the assembly to plate gauge.

11. A method of producing a clad steel plate comprising, forming a steel base slab, assembling on said slab a cladding plate of corrosion-resistant metal of a higher coefficient of expansion than that of said base slab, applying a parting material to the exposed face of said cladding plate, placing a second cladding plate of substantially the same coefficient of expansion as said first cladding plate on said exposed face, placing a second steel base slab on said second cladding plate, said cladding plates being spaced inwardly at their edges from the edges of said base slabs to form a U-shaped peripheral recess around the edges of said assembly, weld sealing the edges of said base slabs to close the open side of said recess, forming a vent for said recess in one of said base slabs, charging the assembly in a heated soaking pit which is cooled to about 1800° F. with the vent at the top, heating directly to a temperature of at least 1950° F. and soaking at this temperature for at least one-quarter hour per inch of assembly thickness, and then removing the assembly from the soaking pit and rolling to weld the contacting plate and slab surfaces and also reduce the assembly to plate gauge.

References Cited in the file of this patent

UNITED STATES PATENTS

| | | |
|---|---|---|
| 1,886,615 | Johnson | Nov. 8, 1932 |
| 1,997,538 | Armstrong | Apr. 9, 1935 |

OTHER REFERENCES

Welding Handbook, third edition, pp. 802–7, published by American Welding Society, 33 W. 39th Street, New York, N.Y.